United States Patent
Huegel et al.

(10) Patent No.: US 8,640,449 B2
(45) Date of Patent: Feb. 4, 2014

(54) HYDRODYNAMIC TORQUE CONVERTER HAVING A VIBRATION ABSORBER AND TORSIONAL VIBRATION DAMPER

(75) Inventors: Christian Huegel, Rheinau (DE); Thorsten Krause, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/431,666

(22) Filed: Mar. 27, 2012

(65) Prior Publication Data
US 2012/0180473 A1   Jul. 19, 2012

Related U.S. Application Data

(63) Continuation of application No. PCT/DE2010/000984, filed on Aug. 23, 2010.

(30) Foreign Application Priority Data

Sep. 28, 2009  (DE) .......................... 10 2009 043 166

(51) Int. Cl.
*F16F 15/12*   (2006.01)

(52) U.S. Cl.
USPC .......................................................... 60/338

(58) Field of Classification Search
USPC ........................... 60/338, 435; 192/3.28, 30 V
See application file for complete search history.

(56) References Cited

U.S. PATENT DOCUMENTS

| | | | | |
|---|---|---|---|---|
| 8,161,740 | B2 * | 4/2012 | Krause et al. | 60/338 |
| 2004/0185940 | A1 * | 9/2004 | Yamamoto et al. | 464/68 |
| 2009/0151344 | A1 * | 6/2009 | Degler et al. | 60/338 |

FOREIGN PATENT DOCUMENTS

| | | |
|---|---|---|
| DE | 19752451 | 6/1998 |
| DE | 19804227 | 8/1999 |
| DE | 10236752 | 2/2004 |
| DE | 102008057647 | 6/2009 |
| DE | 102008057648 | 6/2009 |

* cited by examiner

*Primary Examiner* — Edward Look
*Assistant Examiner* — Logan Kraft
(74) *Attorney, Agent, or Firm* — Simpson & Simpson, PLLC

(57) ABSTRACT

A hydrodynamic torque converter having a pump wheel accommodated in a housing, a turbine wheel, which can be driven by the pump wheel, and a torsional vibration damper, where the torsional vibration damper has a damper input drive component and a damper output drive component, which can rotate to a limited degree with respect to the damper input drive component to oppose the action of at least two damper stages which are operatively connected in series and which each have at least one energy storage element, where the torsional vibration damper also has an intermediate damper component, which is arranged operatively between the damper stages and which directly or indirectly accommodates a vibration absorber, where the energy storage elements of the damper stages are substantially arranged on a common radius, where the vibration absorber is arranged adjacent to the torsional vibration damper in the axial dimension.

12 Claims, 3 Drawing Sheets

HYDRODYNAMIC TORQUE CONVERTER HAVING A VIBRATION ABSORBER AND TORSIONAL VIBRATION DAMPER

CROSS-REFERENCE TO RELATED APPLICATIONS

This patent is filed under 35 U.S.C. §120 and §365(c) as a continuation of International Patent Application No. PCT/DE2010/000984 filed Aug. 23, 2010, which application claims priority from German Patent Application No. 10 2009 043 166.7 filed Sep. 28, 2009, which applications are incorporated herein by reference in their entireties.

FIELD OF THE INVENTION

The invention broadly relates to a hydrodynamic torque converter.

BACKGROUND OF THE INVENTION

Such hydrodynamic torque converters are commonly known. They can be arranged in drive chains of motor vehicles, and particularly between an input drive side and an output drive side. A pump wheel, which is connected to the input drive side is arranged inside a housing of the torque converter, and the pump wheel can drive a turbine wheel. The turbine wheel is in turn connected to the output drive side via the action of a torsional vibration damper. The torsional vibration damper has the primary task of reducing torsional vibrations between the input drive side and the output drive side.

For this purpose, the torsional vibration damper has a damper input drive component connected to a drive component such as a lock-up clutch, as well as a damper output drive component connected to the output drive side, meaning to a damper hub, for example, where the damper output component can rotate to a limited degree with respect to the damper input drive component, opposing the action of two damper stages which are operatively connected in series and which each include multiple energy storage elements. The energy storage elements of the two damper stages are arranged on a common radius, making it possible to achieve a good damping of the torsional vibrations of the torsional vibration damper and of the hydrodynamic torque converter. Additionally, the energy storage elements of the two damper stages are operatively connected to each other via an intermediate damper component, and a vibration absorber, for example, in the form of a centrifugal pendulum, is attached on a radial extension of the intermediate damper component. The vibration absorber functions to improve the torsional vibration damping of the torsional vibration damper.

BRIEF SUMMARY OF THE INVENTION

The problem addressed by the invention is that of reducing the constructed space of the hydrodynamic torque converter while providing the greatest possible torsional vibration damping.

Accordingly, a hydrodynamic torque converter is suggested that has a pump wheel arranged in a housing, a turbine wheel, which can be driven by the pump wheel, and a torsional vibration damper. The torsional vibration damper has a damper input drive component, and a damper output drive component which can rotate to a limited degree with respect to the damper input drive component, opposing the action of at least two damper stages which are operatively connected in series and which each comprise at least one energy storage element. The energy storage element can be designed as a spring-loaded element of any shape, and particularly, as a coil spring, and by way of example as a bow spring or as a compression spring. Additionally, the torsional vibration damper has an intermediate damper component, which is operatively arranged between the damper stages, and which directly or indirectly accommodates a vibration absorber. In this case, the energy storage elements of the damper stages are substantially arranged on a common radius, and the vibration absorber is arranged adjacent to the torsional vibration damper in the axial dimension. In this way, it is possible to reduce the constructed space of the hydrodynamic torque converter, particularly with respect to the radial expansion thereof, while it is also possible to achieve a good damping of torsional vibrations. The damper input drive component can be connected to an input drive component, for example, a lock-up clutch, and the damper output drive component can be attached on an output drive component, such as a damper hub which can be connected to a transmission, or can be connected to the latter in a non-rotatable manner.

The term "radial" refers to a common axis of rotation of the hydrodynamic torque converter, where "radial" indicates a location in a plane running perpendicular to the axis of rotation. The term "axial" indicates a location along the axis of rotation, or along a line parallel thereto.

The vibration absorber is advantageously designed to operate by adapting to the rotation speed of the shaft, particularly as a centrifugal pendulum. A vibration absorber, which adapts to rotation speed, has improved torsional vibration isolation characteristics, for example, as a result of the fact that more vibration frequencies can be absorbed.

In a preferred embodiment, the turbine wheel can rotate with respect to the damper output drive component, opposing the action of at least one damper stage. In this way, the torsional vibration damper functions as a so-called turbine damper. The turbine wheel can be advantageously connected to the intermediate damper component, either directly or indirectly, but in any case in a non-rotatable manner, or in a manner where the turbine wheel can rotate within a certain angle of rotation but is rotationally fixed outside this angle of rotation. By means of this connection between the turbine wheel and the torsional vibration damper, the turbine wheel is operatively inserted, with its functionally operative mass, between at least two damper stages. This results in advantages with respect to the damping of torsional vibration of the hydrodynamic torque converter.

In a further embodiment, the turbine wheel is connected to the damper input drive component in a non-rotatable manner. In this way, the mass of the turbine wheel acts on the output drive side, meaning upstream of the damper stages. This offers advantages under certain circumstances with respect to vibration.

In one embodiment, the energy storage elements are accommodated on the inner side of a locking element which extends around the periphery of the energy storage elements. The locking element can be designed as a retainer, for example, which surrounds a section of the energy storage elements, and can therefore secure against axial and/or radial displacement of the energy storage elements.

In another embodiment, a damper stage has at least two energy storage elements. The energy storage elements can be arranged with a peripheral separation between the same. The energy storage elements of one damper stage can be advantageously connected to operate in parallel. A configuration can also be contemplated where an energy storage element of one damper stage accommodates a further energy storage element, where these two energy storage elements can be connected to operate in parallel. For example, one energy storage element can be designed with a suitably sized inner periphery, such that an additional energy storage device, having a corresponding smaller outer periphery, can be inserted into the large energy storage element, where the peripheral length of these two energy storage elements can be the same or can be different. If the length of the two energy storage elements is the same, they operate in parallel. In contrast, for example, if the energy storage elements have different lengths, parallel operation can only take place starting from a certain angle of rotation.

In another embodiment, the energy storage elements possess a stiffness, and for each damper stage this stiffness is the total stiffness of the damper stage, and the total stiffness of one damper stage is different from the total stiffness of the other damper stage. The total stiffness of the first damper stage, that is, between the damper input drive component and the intermediate damper component, is advantageously lower that the total stiffness of the additional damper stage.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
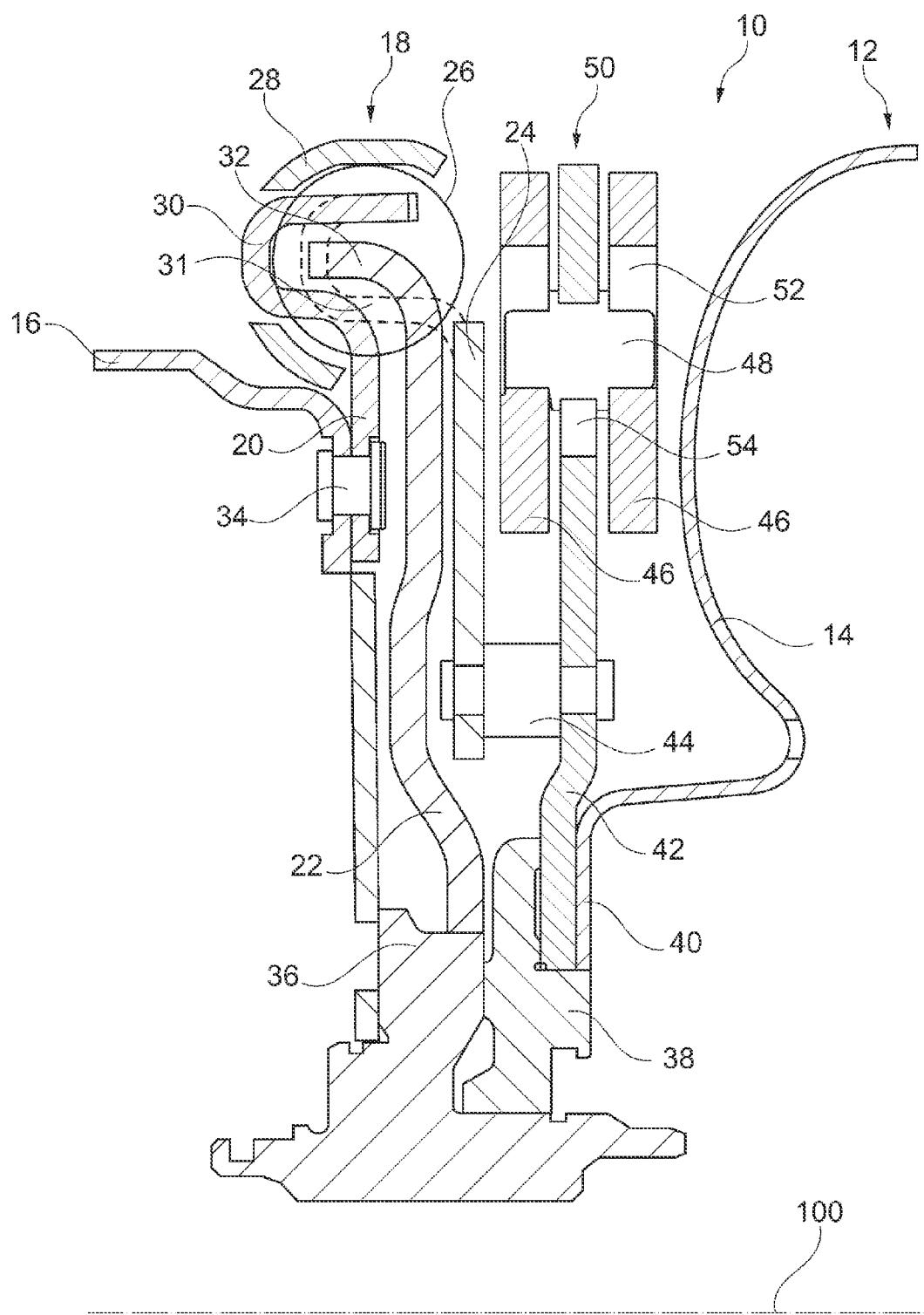
FIG. 1 is a partial cross-sectional view of a hydrodynamic torque converter in one embodiment of the invention.

FIG. 1 is a partial cross-sectional view of one embodiment of hydrodynamic torque converter 10 in a plane perpendicular to axis of rotation 100. Hydrodynamic torque converter 10 has turbine wheel 12, which can be driven by means of a pump wheel, which is not illustrated here. The pump wheel is connected to an input drive side, where the latter is formed by an internal combustion engine, for example. By engaging a lock-up clutch, it is possible to couple the hydrodynamic transmission of torque from the input drive side to the output drive side, the latter formed by a transmission, for example, via the pump wheel and turbine wheel 12. For this purpose, clutch plate carrier 16 of the lock-up clutch is connected in a non-rotatable manner to damper input drive component 20 of torsional vibration damper 18 via connecting element 34, such as a rivet or a spacer bolt. A configuration can also be contemplated where this connection is realized by means of alternative methods of attachment based on a positive fit, a force fit, or a material connection, including welding, bolting, or caulking.

Figure 1A:
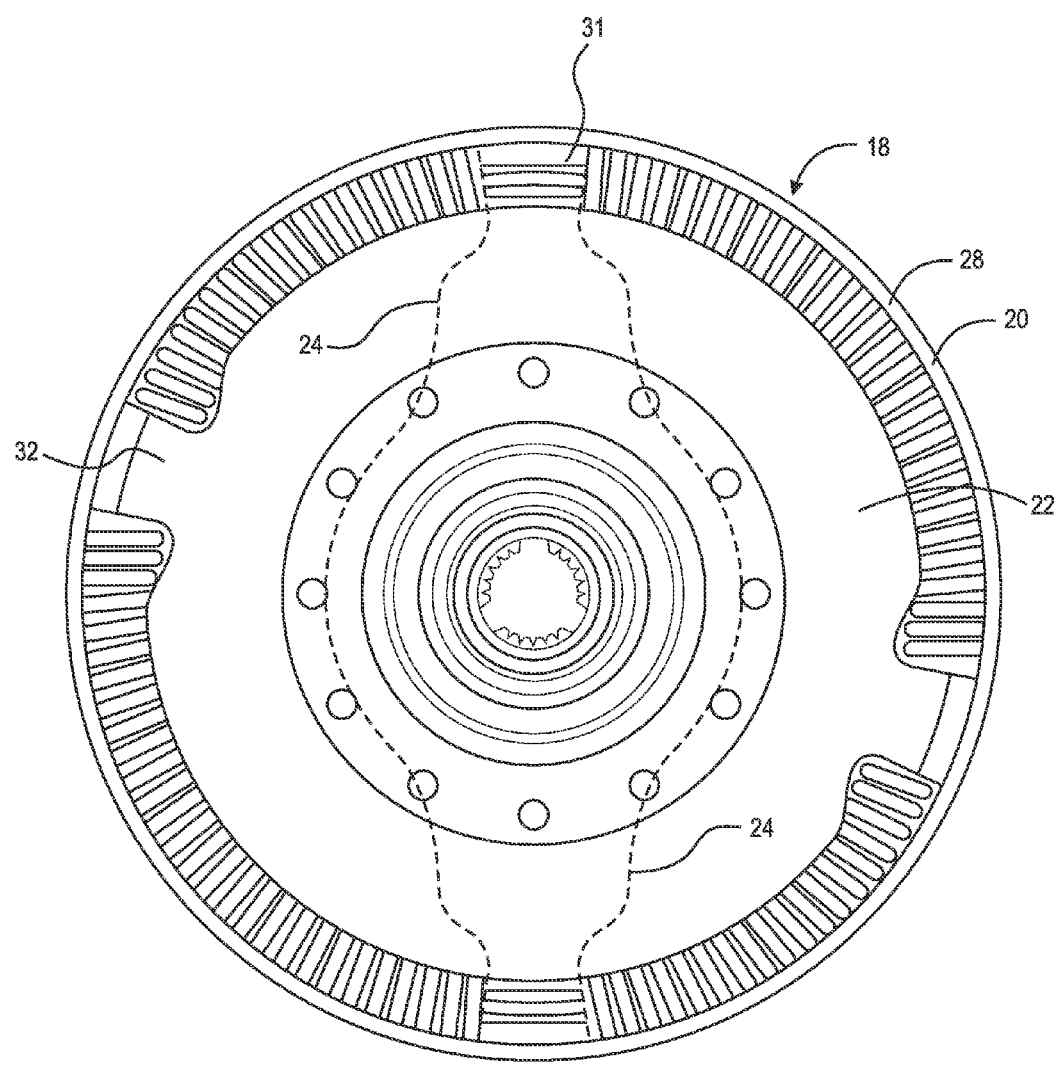
FIG. 1A is a front view of the torsional vibration damper of FIG. 1.

FIG. 1A is a front view of the torsional vibration damper of FIG. 1. Beyond the outer radius of clutch plate carrier 16, torsional vibration damper 18 has energy storage elements 26, which are arranged on the outer periphery of torsional vibration damper 18. As such, damper input drive component 20 can rotate with respect to intermediate damper component 24, the same being an intermediate flange, for example, via a first damper stage and energy storage elements 26, to oppose the action of energy storage elements 26. Intermediate damper component 24 can rotate with respect to damper output drive component 22 of torsional vibration damper 18 via the action of further energy storage elements 26 of a further, second damper stage, where further energy storage elements 26 are arranged on the outer periphery with respect to energy storage elements 26 of the first damper stage, adjacent to elements 26 and on the same radius from axis of rotation 100. The first and the second damper stages are operatively connected in series, and a torsional vibration coming from damper input drive component 20 is first received by the first damper stage, and then is received by the second damper stage.

In order to achieve an equal application in this regard to each of energy storage elements 26, damper input drive component 20 has section 30, the same having substantially a curved S-shape. Damper output drive component 22 and intermediate damper component 24 also have suitable sections 31, 32 for the purpose of transferring vibrational force to, and/or operatively connecting to, energy storage elements 26 of their respective damper stages. Energy storage elements 26 can be designed as bow springs or as compression springs, and are secured via locking element 28, for example a so-called retainer, which extends around the periphery thereof, against radial or axial displacement. Locking element 28 has a partial gap in the periphery thereof at the position of section 30 of damper input drive component 20.

Damper output drive component 22 is connected in a non-rotatable manner by means of suitable attachment methods, for example, by means of welding, to an output drive component on the radial inside of damper output drive component 22, the output drive component being damper hub 36, for example. A torsional vibration directed via clutch plate carrier 16 from the lock-up clutch into torsional vibration damper 18 is transmitted to damper output drive component 22 via damper input drive component 20 and via the two damper stages connected in series, and the torsional vibration is altered by means of the vibrating behavior of torsional vibration damper 18.

Turbine wheel 12 is connected in a non-rotatable manner and in peripheral region 40 on the inside thereof, via turbine shell 14, to turbine hub 38, which can rotate with respect to damper hub 36 and which can be centered by the latter. Disk component 42 is attached in a non-rotatable manner to turbine hub 38 and turbine shell 14, and is situated between the same in the axial dimension. Disk component 42 accommodates, in an outer peripheral section thereof, vibration absorber 50 in the form of a vibration absorber, which adapts to shaft rotation speed, for example, a centrifugal pendulum. Inside vibration absorber 50, disk component 42 is connected in a non-rotatable manner to intermediate damper component 24 via connecting element 44, such as a spacer bolt or a rivet. As such, disk component 42 can rotate with respect to damper output drive component 22 to oppose the action of the second damper stage. This configuration can include a way of limiting the rotary movement of intermediate damper component 24 with respect to damper output drive component 22, for example, by means of limit stops, such that an excess of torque delivered by turbine wheel 12 does not place a load on energy storage elements 26 of the second damper stage, which exceeds a defined maximum torque.

Vibration absorber 50 and disk component 42 are arranged adjacent to one another in the axial dimension of torsional vibration damper 18, between intermediate damper component 24 and turbine shell 14. Vibration absorber 50 has two absorber masses 46, which are spaced in the axial dimension and separated by disk component 42. Absorber masses 46 are attached to each other by means of connecting elements, for example, by means of spacer bolts, and are able to move with respect to disk component 42 inside cutaway sections 52 of pendulum masses 46, and inside cutaway sections 54 of disk component 42, within the range of play defined by cutaway sections 52, 54, via mounting elements 48 such as roller elements, roller bearings, sliding bearings, or comparable elements. By means of arranging vibration absorber 50 adjacent to torsional vibration damper 18 in the axial dimension, and particularly between turbine shell 14 and torsional vibration damper 18, it is possible to reduce the constructed space of hydrodynamic torque converter 10.

Figure 2:
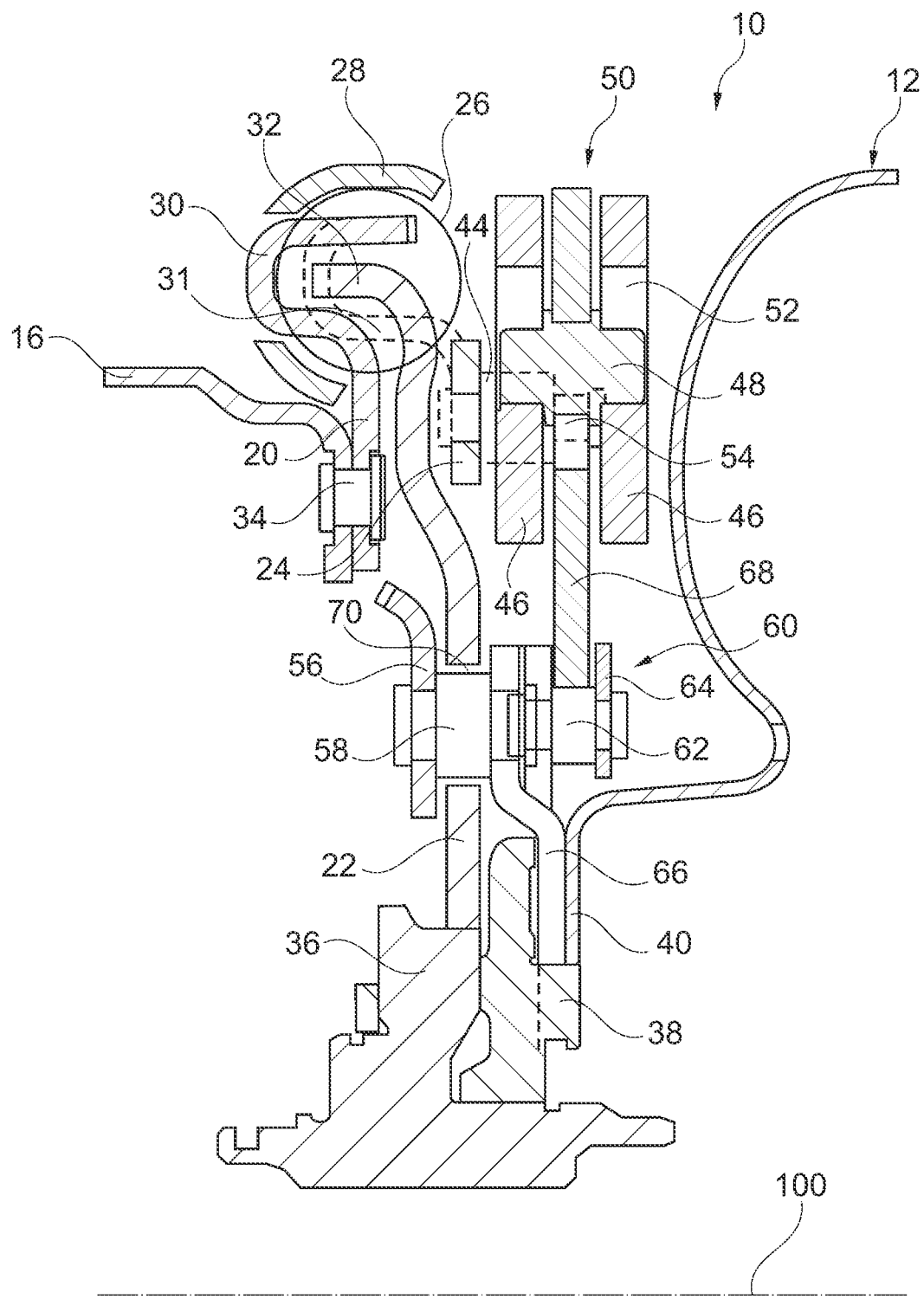
FIG. 2 is a partial cross-sectional view of a hydrodynamic torque converter in a further embodiment of the invention.

FIG. 2 illustrates a partial cross-sectional view of another embodiment of hydrodynamic torque converter 10. Torsional vibration damper 18 is connected in a non-rotatable manner via damper input drive component 20 to clutch plate carrier 16 of a lock-up clutch. Damper input drive component 20 is suitable for exerting force by means of section 30 onto energy storage elements 26 of a first damper stage. Energy storage elements 26 are operatively arranged between damper input drive component 20 and intermediate damper component 24, particularly on the outer periphery thereof. Intermediate damper component 24 can exert force onto further energy storage elements 26 of a second damper stage which is operatively connected in series to the first damper stage, by means of section 31, where energy storage elements 26 are operatively arranged between intermediate damper component 24 and damper output drive component 22.

Energy storage elements 26 can be designed as bow springs or as compression springs, and are secured against axial and radial displacement via locking element 28, for example, via a so-called retainer, which extends along the periphery. Locking element 28 has gaps on the peripheral side thereof in sections corresponding to the positions of section 30 of damper input drive component 20, section 30 extending in the axial dimension, as well as at the positions of connecting element 34. Locking element 28 has extension 56, which runs inward toward the radial center. By means of extension 56, locking element 28 is connected in a non-rotatable manner to disk component 66 via connecting element 58, which extends through cutaway section 70 of damper output drive component 22, where the connecting element 58 is a bolt, spacer, or a rivet, for example. Disk component 66 is attached to turbine shell 14 of turbine wheel 12, and to turbine hub 38, and arranged between these two elements in the axial dimension, particularly by means of a positive fit or material connection.

In this way, turbine wheel 12 is connected to damper input drive component 20. As such, the configuration can include a means of limiting the rotary movement of damper input drive component 20 with respect to intermediate damper component 24 and/or to damper output component 22, for example, in the form of limit stops, in order to prevent an excess torque coming from turbine wheel 12 from exerting a toad on energy storage elements 26 of the damper stage or of the damper stages which is higher than a defined maximum torque. The limiting of the rotary movement can also be realized by means of connecting elements 58. In this case, connecting elements 58 have a defined range of play over a clearance angle, in cutaway sections 70 of damper output drive component 22. In the event that the clearance angle of damper output drive component 22 is exceeded, connecting elements 58 rotate and bridge the energy storage elements between damper input drive component 20 and damper output drive component 22.

In section 60 of disk component 66, where section 60 is at a height from the radial center, which is equal to that of attachment element 58, disk component 66 includes connecting elements 62 on the outer periphery thereof, where the same fix retaining washer 64 at a distance from disk component 66 along the axial dimension. Further disk component 68 is accommodated between retaining washer 64 and disk component 66, and disk component 68 can rotate with respect to retaining washer 64 and disk component 66, and is centered both radially and axially via connecting element 62. Vibration absorber 50, which adapts to rotation speed, such as a centrifugal pendulum, is arranged on disk component 68. The vibration absorber is situated adjacent to torsional vibration damper 18 in the axial dimension. Disk component 68 is connected in a non-rotatable manner to intermediate damper component 24 via connecting element 44. As such, vibration absorber 50 is connected indirectly to intermediate damper component 24, and is arranged operatively between the first and the second damper stages of torsional vibration damper 18.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMBERS 10 torque converter
12 turbine wheel
14 turbine shell
16 clutch plate carrier
18 torsional vibration damper
20 damper input drive component
22 damper output drive component
24 intermediate damper component
26 energy storage element
28 locking element
30 section
31 section
32 section
34 connecting element
36 damper hub
38 turbine hub
40 peripheral region
42 disk component
44 connecting element
46 absorber mass
48 mounting element 50 vibration absorber
52 section
54 section
56 extension
58 connecting element
60 section
62 connecting element
64 retaining washer
66 disk component
68 disk component
70 cutaway section
100 axis of rotation

What is claimed is:

1. A hydrodynamic torque converter (10) comprising:
a pump wheel accommodated in a housing,
a turbine wheel (12) which can be driven by the pump wheel,
a torsional vibration damper (18), including:
at least two damper stages which are operatively connected in series and which each have at least one energy storage element (26);
an intermediate damper component (24) which is arranged operatively between the damper stages;
a damper input drive component (20); and
a damper output drive component (22) which can rotate to a limited degree with respect to the damper input drive component (20) to oppose an action of the at least two damper stages; and,
a vibration absorber (50) directly or indirectly accommodated by the intermediate damper component, wherein the energy storage elements (26) of the damper stages are substantially arranged on a common radius, wherein the vibration absorber (50) is arranged adjacent to the torsional vibration damper (18) in the axial dimension.

2. A hydrodynamic torque converter (10) as recited in claim 1, wherein the vibration absorber (50) adapts to the rotation speed, and is particularly designed as a centrifugal pendulum.

3. A hydrodynamic torque converter (10) as recited in claim 1, wherein the turbine wheel (12) can rotate with respect to the damper output drive component (22) to oppose the action of at least one of the damper stages.

4. A hydrodynamic torque converter (10) as recited in claim 3, wherein the turbine wheel (12) is connected in a non-rotatable manner to the intermediate damper component (24).

5. A hydrodynamic torque converter (10) as recited in claim 3, wherein the turbine wheel (12) is connected in a non-rotatable manner to the damper input drive component (20).

6. A hydrodynamic torque converter (10) as recited in claim 1, wherein the energy storage elements (26) are accommodated inside a locking element (28) which extends along the periphery.

7. A hydrodynamic torque converter (10) as recited in claim 1, wherein a damper stage has at least two energy storage elements (26).

8. A hydrodynamic torque converter (10) as recited in claim 7, wherein the energy storage element of one damper stage accommodates a further energy storage element.

9. A hydrodynamic torque converter (10) as recited in claim 7, wherein the energy storage elements (26) of one damper stage can be connected to work in parallel.

10. A hydrodynamic torque converter (10) as recited in claim 1, wherein the energy storage elements (26) possess a stiffness, and for each damper stage this stiffness is the total stiffness of the damper stage, and the total stiffness of one damper stage is different from the total stiffness of the other damper stage.

11. A hydrodynamic torque converter, comprising:
a pump wheel accommodated in a housing,
a turbine wheel which can be driven by the pump wheel, and,
a torsional vibration damper, including:
a damper hub;
an input component arranged to receive torque;
an output component non-rotatably connected to the damper hub;
an intermediate damper component;
a first damper stage including at least one first energy storage element engaged with the input component and the intermediate damper component such that the intermediate damper component is rotatable with respect to the input component; and,
a second damper stage including at least one second energy storage element engaged with the intermediate damper component and the output component such that the intermediate damper component is rotatable with respect to the output component; and,
a vibration absorber non-rotatably connected to the intermediate damper component, wherein:
a portion of the input component is:
at a same distance, in a direction orthogonal to an axis of rotation for the torque converter, as the at least one first energy storage element; and,
extends past the at least one first energy storage element in a direction parallel to an axis of rotation for the torque converter.

12. A hydrodynamic torque converter, comprising:
a pump wheel accommodated in a housing,
a turbine wheel which can be driven by the pump wheel, and,
a torsional vibration damper, including:
a damper hub;
an input component arranged to receive torque and non-rotatably connected to the turbine wheel;
an output component non-rotatably connected to the damper hub;
an intermediate damper component;
a first damper stage including:
at least one first energy storage element engaged with the input component and the intermediate damper component such that the intermediate damper component is rotatable with respect to the input component; and,
a locking element:
non-rotatably connected to the turbine wheel; and,
including an opening with first and second edges aligned in a direction orthogonal to an axis of rotation for the torque converter and through which a portion of the input component passes in a direction parallel to the axis of rotation;
a second damper stage including at least one second energy storage element engaged with the intermediate damper component and the output component such that the intermediate damper component is rotatable with respect to the output component; and,
a vibration absorber non-rotatably connected to the intermediate damper component.

* * * * *